United States Patent Office 3,347,866
Patented Oct. 17, 1967

3,347,866
4-(INDOL-3-YL)-HEXAHYDRO-1H-AZEPINES AND THEIR METHOD OF PREPARATION
Jackson B. Hester, Jr., Portage, Mich., assignor to The Upjohn Company, Kalamazoo, Mich., a corporation of Delaware
No drawing. Filed June 22, 1965, Ser. No. 466,102
6 Claims. (Cl. 260—326.15)

This invention relates to novel 4-(indol-3-yl)-hexahydro-1H-azepines, to processes for making the same, and to novel intermediates prepared in the process.

The novel 4-(indol-3-yl)-hexahydro-1H-azepines of the present invention can be represented by the following formula:

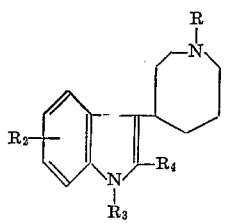

I wherein R, $R_3$, and $R_4$ are hydrogen or alkyl of not more than 4 carbon atoms, and $R_2$ is hydrogen, alkyl of not more than 4 carbon atoms, alkoxy of not more than 4 carbon atoms, or halogen. Examples of alkyl of not more than 4 carbon atoms are methyl, ethyl, propyl, isopropyl, butyl, isobutyl secondary butyl, and tertiary butyl. Examples of alkoxy are methoxy, ethoxy, propoxy, isopropoxy, butoxy, isobutoxy, secondary butoxy, and tertiary butoxy. Examples of halogen are fluoro, chloro, and bromo.

The novel compounds of the invention are nitrogenous bases and, as such, can exist in the protonated and nonprotonated forms according to the pH of the environment. When R is alkyl the nonprotonated form can be oxidized, with hydrogen peroxide, for example, to form the N-oxide. The N-oxide can exist in both the protonated and nonprotonated forms according to the pH of the environment. The protonated forms can be isolated as acid addition salts which are useful in upgrading the free base and the free base N-oxide forms, that is, the nonprotonated forms. Suitable acids for this purpose include hydrochloric acid, sulfuric acid, phosphoric acid, thiocyanic acid, fluosilicic acid, picric acid, Reinecke's acid, azobenzenesulfonic acid, palmitic acid, acetic acid, maleic acid, and cyclohexanesulfamic acid. The acid addition salt can be formed by neutralizing the free base or free base N-oxide with the appropriate acid or by metathesis of a simple acid addition salt such as the hydrochloride or sulfate with another salt of the desired acid. The novel compounds of the invention are useful intermediates, thus, the condensation products obtained from thiocyanic acid addition salts and formaldehyde, according to U.S. Patents 2,425,320 and 2,606,155, are useful as pickling inhibitors, and the fluosilicic acid addition salts are useful as mothproofing agents according to U.S. Patents 1,915,334 and 2,075,359.

Novel compounds of the invention wherein R is alkyl can also exist in the form of quaternary ammonium salts such, for example, as those obtained by coordinating the free base form with a loweralkyl halide, for example, methyl, ethyl, propyl, butyl, pentyl, hexyl, heptyl, and octyl chloride, bromide, or iodide, including the isomeric forms thereof. The quaternary ammonium salts are useful for forming the corresponding fluosilicic acid quaternary ammonium salts which are useful as mothproofing agents. These fluosilicic acid salts can be formed by metathesis of a quaternary ammonium salt with an inorganic fluosilicate or by liberating the free base, that is, the quaternary ammonium hydroxide (by treating the quaternary ammonium salt with an equivalent of base, for example, sodium hydroxide) and neutralizing with fluosilicic acid. Higher quaternary ammonia salts, as are obtained as described above by using alkyl halides up to 18 carbon atoms, for example, where the alkyl group is nonyl, decyl, dodecyl, tridecyl, tetradecyl, pentadecyl, hexadecyl, heptadecyl, octadecyl, and the isomeric forms thereof, are surface active compounds useful as wetting agents and as disinfectants.

The compounds of the invention can be prepared by reducing with lithium aluminum hydride a compound of the following formula:

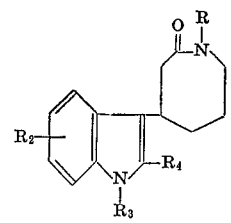

II wherein R, $R_2$, $R_3$, and $R_4$ are as given above. The lithium aluminum hydride reduction can be effected in the manner already known in the art using, for example, ether, dioxane, or tetrahydrofuran as an inert solvent.

The intermediates of Formula II can be prepared by decarboxylating a compound of the following formula:

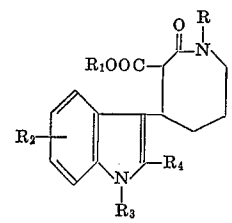

III wherein R, $R_2$, $R_3$, and $R_4$ are as given above, and $R_1$ is hydrogen. The decarboxylation is effected in a manner already known in the art, simply by heating the acid at its melting point under reduced pressure.

The intermediates of Formula III wherein $R_1$ is hydrogen are obtained by hydrolysis of the corresponding esters wherein $R_1$ is alkyl of not more than 4 carbon atoms, for example, methyl, ethyl, propyl, butyl, and isomeric forms thereof. The hydrolysis is effected by heating the ester in a basic aqueous solution, for example, by refluxing in aqueous ethanol to which potassium hydroxide has been added. Other solvents such as aqueous methanol, aqueous tetrahydrofuran, or aqueous propanol and other bases such as sodium hydroxide or lithium hydroxide can be used. The resulting alkali metal salt is converted to the corresponding acid by treatment with mineral acids, for example, hydrochloric or sulfuric acids.

The intermediates of Formula III wherein $R_1$ is alkyl are prepared by reacting with dialkyl malonate, for example, diethyl malonate, a compound of the following formula:

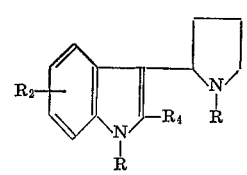

IV wherein R, $R_2$, $R_3$, and $R_4$ are as given above. The reaction is carried out in the presence of a strong base, for example, sodium hydroxide, and in an inert solvent, for example, xylene. Other suitable strong bases include sodium, sodium hydride, and potassium hydroxide. Other suitable inert solvents include toluene, chlorobenzene, and decahydronaphthalene. The reaction mixture can be worked up for the recovery of the product by neutralization of the base followed by solvent extraction and/or chromatography and like methods already known in the art. In some instances, two isomeric forms of the compounds of Formula III are obtained. These isomers can be separated by chromatography and/or fractional crystallization, if desired, and both isomers on alkaline hydrolysis followed by acidification yield compounds of Formula III wherein $R_1$ is hydrogen. It is not necessary, however, to effect a separation because mixtures of the two isomers as crude reaction products can be hydrolyzed to give compounds of the invention.

The starting 3-(2-pyrrolidinyl)indoles of Formula IV can be prepared by processes already known in the art, for example, Youngdale et al., J. Med. Chem. 7, 415 (1964).

Typical 3-(2-pyrrolidinyl)indoles which can be thus prepared and which can be used as starting compounds for the process of the invention include 3-(2-pyrrolidinyl)indole, 1-methyl-3-(2-pyrrolidinyl)indole, 3-(1-methyl-2-pyrrolidinyl)indole, 3-(1-ethyl-2-pyrrolidinyl)indole, 1-methyl-3-(1-methyl-2-pyrrolidinyl)indole, 5 - methyl-3-(1-methyl-2-pyrrolidinyl)indole, 7 - methyl-3-(1-methyl-2-pyrrolidinyl)indole, 5 - methoxy-3-(1-methyl-2-pyrrolidinyl)indole, 4-chloro-3-(1-methyl-2-pyrrolidinyl)indole, 5-chloro-3-(1-methyl-2-pyrrolidinyl)indole, 5 - bromo-3-(1-methyl-2-pyrrolidinyl)indole, and 5-fluoro-3-(1-methyl-2-pyrrolidinyl)indole. By use of appropriate starting indoles in the processes of Youngdale et al., supra, other starting compounds of Formula IV are readily obtained.

The novel compounds of the invention (Formula I) have, antiviral, and antibacterial activity and are useful as stimulants in mammals, birds, and other animals, for example, in rats, and have activity against KB cells in agar, Newcastle disease virus in chick embryo cells, and *Bacillus subtilis* and *Mycobacterium phlei* in vitro, and can be utilized for decontamination of surfaces infected with these organisms. The intermediate compounds of Formula II also have pharmacodynamic activity, being active as anticonvulsants and strychnine antagonists. They also are active against KB cells in agar and Newcastle disease virus in chick embryo cells.

The following example is given by way og illustration, it being understood that the 3-(1-methyl-2-pyrrolidinyl)indole can be substituted by any of the 3-(2-pyrrolidinyl)indoles of Formula IV, e.g., those given above. It is to be understood also that the diethyl malonate can be substituted by other dialkyl malonates, for example, dimethyl, dipropyl, diisopropyl, dibutyl, diisobutyl, di-sec.butyl, and di-tert.butyl malonates.

*Example.*—4-(indol-3-yl)-1-methylhexahydro-1H-azepine (A) ETHYL 1-METHYL-2-OXO-4-(INDOL-3-YL)-HEXAHYDRO-1H-AZEPINE-3-CARBOXYLATE

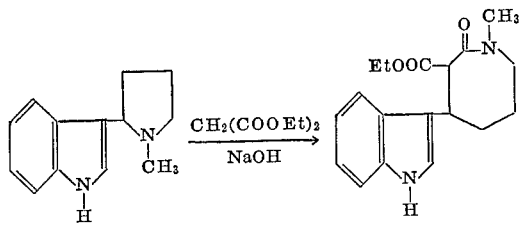

A mixture of 3-(1-methyl-2-pyrrolidinyl)indole (50 g.; 0.25 mole), diethyl malonate (42 g.; 0.262 mole), powdered sodium hydroxide (1.0 g.) and xylene (300 ml.) was allowed to reflux under nitrogen for 31.25 hours. During this period ethanol, formed in the reaction, was removed by distillation. Additional 500-mg. portions of powdered sodium hydroxide were added to the reaction mixture after the reaction had proceeded for 7.5 hours and 25.5 hours. The cooled reaction mixture was poured into dilute acetic acid and the mixture was extracted with chloroform. The extract was washed successively with water, dilute ammonium hydroxide, and saturated aqueous sodium chloride, dried over anhydrous sodium sulfate, and concentrated under reduced pressure. The last traces of xylene were removed from the residue by azeotropic distillation, first with toluene and then benzene. A benzene solution of the resulting brown oil was adsorbed on 2 pounds of neutral alumina and chromatographed. With benzene 4.006 g. of indole, M.P. 51–54° C., was eluted. Elution of the column with 50% ether-chloroform followed by ethyl acetate crystallization yielded 11.132 g. of ethyl 1-methyl-2-oxo-4-(indol-3-yl)-hexahydro-1H-azepine - 3 - carboxylate (isomer A); M.P. 191–195° C. A sample of this material was recrystallized several times from methanolethyl acetate for analysis; M.P. 196.5–198° C. The ultraviolet spectrum (ethanol) had $\lambda_{max}$. 220, 281.5, and 290 m$\mu$ ($\epsilon$ 35,750, 5,950, and 5,150, respectively) with an inflection at 275 m$\mu$ ($\epsilon$ 5,550). The infrared spectrum (mineral oil) showed NH: 3290 cm.$^{-1}$ and C=O: 1740 and 1627 cm.$^{-1}$.

*Analysis.*—Calcd. for $C_{19}H_{22}N_2O_3$: C, 68.77; H, 7.05; N, 8.91. Found: C, 68.36; H, 7.13; N, 8.98.

Concentration of the mother liquors from the above crystallizations yielded a brown oil (9.09 g.) which had practically the same infrared spectrum as the above crystalline product. An ice-cold solution of the material in 150 ml. of absolute methanol was treated with 30 ml. of 0.976 N aqueous sodium hydroxide. The resulting solution was allowed to warm to about 25° C. After a few hours a crystalline precipitate formed. After 24 hours standing, water was added to the mixture which was then concentrated to remove the methanol. The solid which remained was collected by filtration, washed with water, and dissolved in methylene chloride. The methylene chloride solution was washed with water, dried over anhydrous sodium sulfate, and concentrated in vacuo. Crystallization of the residue from methanol-ethyl acetate yielded three crops; 2.888 g., M.P. 209.5–212.5° C.; 0.623 g., M.P. 202.5–205° C.; and 0.132 g., M.P. 194–198° C. An analytical sample of ethyl 1-methyl-2-oxo-4-(indol-3-yl)-hexahydro-1H-azepine-3 - carboxylate (isomer B), M.P. 212.5–214.5° C., was prepared by recrystalizing the first crop from methylene chloride-methanol. The ultraviolet spectrum (methanol) had $\lambda_{max}$. 221, 281, and 290 m$\mu$ ($\epsilon$ 37,100, 6,150, and 5,350, respectively) with an inflection at 274 m$\mu$ ($\epsilon$ 5,700). The infrared spectrum (chloroform and mineral oil) was almost identical to that of isomer A. A mixed melting point with isomer A was taken; M.P. 201–212.5° C.

*Analysis.*—Calcd. for $C_{18}H_{22}N_2O_3$: C, 68.77; H, 7.05; N, 8.91. Found: C, 68.75; H, 7.18; N, 8.92.

(B) 1-METHYL-2-OXO-4-(INDOL-3-YL)-HEXAHYDRO-1H-AZEPINE-3-CARBOXYLIC ACID

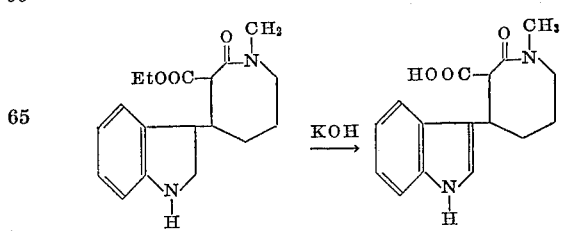

A solution of 1.0 g. (3.18 millimoles) of the ester of Part A (isomer A, M.P. 197–198.5° C.) in 50 ml. of warm, absolute ethanol was treated with 7.33 ml. of 0.433 N aqueous potassium hydroxide. The resulting solution was allowed to reflux gently for 7 hours under nitrogen. The mixture was concentrated under reduced pressure and the residue was suspended in water and the suspension was filtered. The solid obtained in this manner was washed with water and dried in vacuo to yield 64 mg. of starting material, M.P. 187–189° C. The aqueous filtrate was cooled in an ice bath and acidified with concentrated hydrochloric acid. The solid which precipitated was collected by filtration, washed with water, and dried in vacuo to yield 753 mg. (82.9% yield) of 1-methyl-2-oxo-4-(indol-3-yl)-hexahydro-1H-azepine - 3 - carboxylic acid, M.P. 151.5–154° C. (dec.). The infrared spectrum (mineral oil) showed NH: 3346 cm.$^{-1}$ and C=O: 1714 and 1589 cm.$^{-1}$.

(C) 1-METHYL-2-OXO-4-(INDOL-3-YL)-HEXAHYDRO-1H-AZEPINE

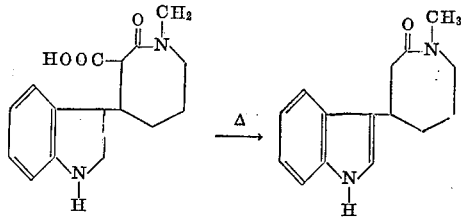

The acid of Part B (0.589 g.; 2.05 millimoles) was heated in a small evacuated flask (14 mm. Hg pressure) at 178 C. for 5 minutes. Decarboxylation occurred rapidly as the compound melted. The cooled, colorless glass that resulted was dissolved in ethyl acetate and crystallized to yield 443 mg. (89.5% yield) of 1-methyl-2-oxo-4-(indol-3-yl)-hexahydro-1H-azepine, M.P. 147–149° C. An analytical sample, M.P. 148–150° C., was prepared by recrystallizing this material three times from ethyl acetate. The ultraviolet spectrum (ethanol) had $\lambda_{max}$. 221.5, 281.5, and 290 m$\mu$ ($\epsilon$ 38,300, 6,000, and 5,250, respectively) with an inflection at 275 m$\mu$ ($\epsilon$ 5,550). The infrared spectrum (mineral oil) showed NH: 3240 cm.$^{-1}$ and C=O: 1625 cm.$^{-1}$.

Analysis.—Calcd. for $C_{15}H_{18}N_2O$: C, 74.35; H, 7.49; N, 11.56. Found: C, 74.34; H, 7.37; N, 11.22.

(D) 1-METHYL-4-(INDOL-3-YL)-HEXAHYDRO-1H-AZEPINE

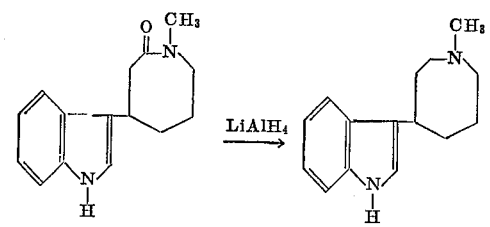

To an ice-cold suspension of 6.0 g. of lithium aluminum hydride in 600 ml. of dry tetrahydrofuran, under nitrogen, was added with stirring, 6.0 g. (24.7 millimoles) of the lactam of Part C. The resulting mixture was allowed to reflux gently with stirring for 6.66 hours and stand at about 25° C. for 18 hours. It was then cooled in an ice bath and treated successively with 6 ml. of water, 6 ml. of 15% aqueous sodium hydroxide, and 18 ml. of water. The inorganic precipitate was collected by vacuum filtration and washed with ether. Concentration of the combined filtrate and washing yielded a colorless oil which was dissolved in ether. The solution was filtered and crystallized from ether-Skellysolve B (technical hexane) to yield two crops: 3.73 g., M.P. 81–85° C., and 1.34 g., M.P. 81–84.5° C. (89.8% yield), of 1-methyl-4-(indol-3-yl)-hexahydro-1H-azepine. The analytical sample, M.P. 81–85° C., was prepared by recrystallizing a portion of this material twice from ether-Skellysolve B. The ultraviolet spectrum (ethanol) had $\lambda_{max}$. 222, 282, and 290 m$\mu$ ($\epsilon$ 35,200, 5,850, and 5,100 respectively) with an inflection at 275 m$\mu$ ($\epsilon$ 5,400). The infrared and nuclear magnetic resonance spectra supported the structure.

Analysis.—Calcd. for $C_{15}H_{20}N_2$; C, 78.90; H, 8.83; N, 12.27. Found: C, 78.78; H, 9.10; N, 11.91.

I claim:

1. A member of the group consisting of compounds of the formula:

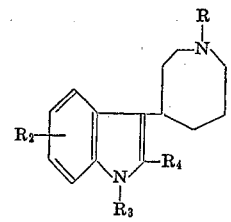

wherein R, $R_3$, and $R_4$ are members of the group consisting of hydrogen and alkyl of not more than 4 carbon atoms, and $R_2$ is a member of the group consisting of hydrogen, alkyl of not more than 4 carbon atoms, alkoxy of not more than 4 carbon atoms, and halogen, and the acid addition salts thereof, the N-oxides where R is alkyl and the acid addition salts thereof, and the alkyl quaternary ammonium salts where R is alkyl.

2. A compound of Formula I wherein R, $R_3$, and $R_4$ are hydrogen or alkyl of not more than 4 carbon atoms, and $R_2$ is hydrogen, alkyl of not more than 4 carbon atoms, alkoxy of not more than 4 carbon atoms, or halogen.

3. 1-methyl-4-(indol-3-yl)-hexahydro-1H-azepine.

4. A process for making a compound of the following formula:

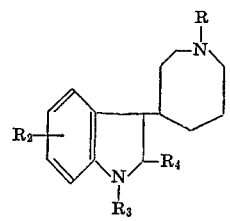

wherein R, $R_3$, and $R_4$ are hydrogen or alkyl of not more than 4 carbon atoms, and $R_2$ is hydrogen, alkyl of not more than 4 carbon atoms, alkoxy of not more than 4 carbon atoms, or halogen, which comprises reacting with a dialkyl malonate in the presence of a strong base a compound of the formula:

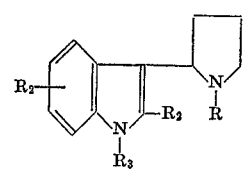

wherein R, $R_2$, $R_3$, and $R_4$ are as given above, to form a compound of the following formula:

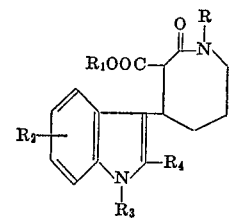

wherein R, $R_2$, $R_3$, and $R_4$ are as given above, and $R_1$ is alkyl, subjecting the resulting compound to alkaline hydrolysis followed by neutralization to form a compound of Formula III wherein R, $R_2$, $R_3$, and $R_4$ are as given above and $R_1$ is hydrogen, heating the resulting compound as required to effect decarboxylation to form a compound of the following formula:

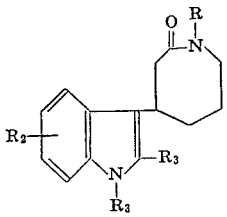

II wherein R, $R_2$, $R_3$, and $R_4$ are as given above, and subjecting the resulting compound to lithium aluminum hydride reduction.

5. A process for making a compound of Formula I which comprises hydrolyzing a compound of Formula III wherein R, $R_3$, and $R_4$ are hydrogen or alkyl of not more than 4 carbon atoms, $R_2$ is hydrogen, alkyl of not more than 4 carbon atoms, alkoxy of not more than 4 carbon atoms, or halogen, and $R_1$ is alkyl, to the free acid, decarboxylating the resulting compound to give a compound of Formula II wherein R, $R_2$, $R_3$, and $R_4$ are as given above, and reducing the resulting compound with lithium aluminum hydride.

6. A process for making a compound of Formula I which comprises decarboxylating a compound of Formula III wherein R, $R_3$, and $R_4$ are hydrogen or alkyl of not more than 4 carbon atoms, $R_2$ is hydrogen, alkyl of not more than 4 carbon atoms, alkoxy of not more than 4 carbon atoms, or halogen, and $R_1$ is hydrogen, to form a compound of Formula II wherein R, $R_2$, $R_3$, and $R_4$ are as given above, and reducing the resulting compound with lithium aluminum hydride.

References Cited

UNITED STATES PATENTS

| | | | |
|---|---|---|---|
| 2,740,779 | 4/1956 | Diamond et al. | 260—239 |
| 3,040,029 | 6/1962 | Poppelsdorf et al. | 260—239 |
| 3,043,849 | 7/1962 | Szmuszkovicz | 260—326.15 |
| 3,072,530 | 1/1963 | Hofmann et al. | 260—326.15 |
| 3,109,844 | 11/1963 | Perron et al. | 260—247.2 |
| 3,218,333 | 11/1965 | Roozemond | 260—326.15 |

OTHER REFERENCES

Julia et al.: Bull. Chim. Soc., August 1964, pp. 1924–1927, 1934–1936, and 1939–1945.

Youngsdale et al.: Jour. Med. Chem., vol. 7, July 1964, pp. 415–427.

ALEX MAZEL, *Primary Examiner.*

NICHOLAS S. RIZZO, *Examiner.*

J. A. NARCAVAGE, M. O'BRIEN, *Assistant Examiners.*